United States Patent Office 3,525,017
Patented Aug. 18, 1970

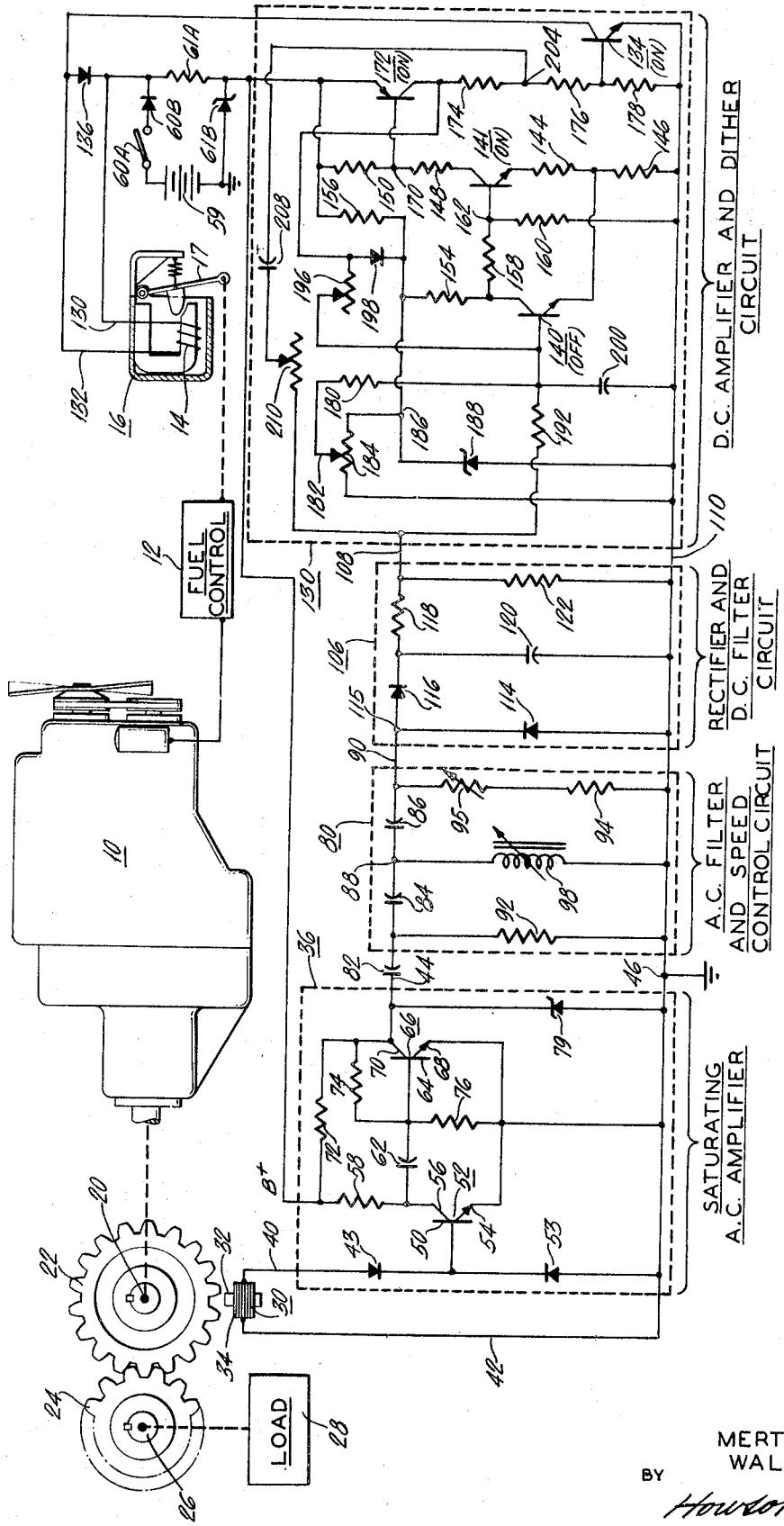
INVENTORS:
MERTON I. ROSENBERG
WALTER G. BOHAKER
BY
Howson & Howson
ATTYS.

3,525,017
ELECTRIC GOVERNOR APPARATUS
Merton I. Rosenberg and Walter G. Bohaker, Springfield, Mass., assignors to AMBAC Industries Incorporated, Columbus, Miss., a corporation of New York
Filed Jan. 8, 1968, Ser. No. 696,444
Int. Cl. G05b 11/26
U.S. Cl. 317—5                                              6 Claims

ABSTRACT OF THE DISCLOSURE

An electrical engine-speed governor suitable for variable speed or constant speed use, in which the fuel control for the engine is kept in substantially continuous oscillating motion about the desired average position to provide a "dither" action, whereby static friction is eliminated from the fuel-control actuating apparatus and linkages so that better stability, control and transient response are provided. Preferably the "dither" action is provided by utilizing a solenoid actuator for the fuel control and supplying the solenoid with a current which alternates between a higher and a lower value; control of the average position of the solenoid actuator is achieved by varying the relative durations of the high current and the low current intervals in response to electrical signals indicative of engine speed. In the preferred embodiment the "dither" control circuit comprises a transistorized Schmitt trigger circuit provided with a feedback connection such that the relative durations of the on and off intervals of conduction in each of the transistors of the Schmitt circuit can be controlled in response to a varying DC control voltage indicative of engine speed.

BACKGROUND OF THE INVENTION

This invention relates to electric governor apparatus, and to engine systems in which the speed of the engine is automatically controlled or governed by an electrical governor.

It is well known in the art to control automatically the fuel supply for an engine so as to maintain its speed substantially at a predetermined value despite changes in load on the engine or changes in environmental conditions, for example. It is also known to provide such systems in which the speed which is maintained by the governoring apparatus can be changed controllably, either to permit use in different applications or to permit throttle adjustment of the governed speed during use in a given application; such systems are known, respectively, as constant-speed governors and variable speed governors. Various forms of electrical governors have been proposed for such purposes which derive electrical signals indicative of engine speed, process these signals in appropriate circuits, and use them to control the fuel supply to the engine so as to maintain the desired constant or controlledly variable engine speed.

Our co-pending application Ser. No. 507,392, filed Nov. 12, 1965 and entitled Electric Governor System describes and claims one particularly advantageous form of such electrical governor system, which employs speed-sensing means for deriving an original electrical signal having a frequency and an amplitude varying with the speed of an engine to be governed, and in which this original electrical signal is supplied to limiting means which convert it to a modified signal varying in frequency with said engine speed but having an R.M.S. value which is substantially invariant with changes in said engine speed over a substantial range of engine speeds. The resulting modified signal is supplied to frequency-sensing means which produces an output signal varying in R.M.S. value with the frequency of said modified electrical signal over at least a part of the range of frequencies produced by changes in said engine speed; the latter output signal also responds to any changes in R.M.S. value of signals supplied to the frequency-sensing means, but, since the above-mentioned limiting means have removed variations in R.M.S. value from the electrical signal, the output signal from the frequency-sensing means depends only on the frequency of the input signals supplied thereto and hence only on engine speed. The output signal from the frequency-sensing means is then supplied to means for controlling the speed of said engine to maintain it at a predetermined fixed or controllable value.

In the above-described apparatus of our co-pending application, the fuel control for the engine is preferably operated by a linear solenoid actuator supplied with current through a control transistor. An average current is present at all times, and is varied automatically to be greater or less in response to the circuitry preceding it, in such fashion as to stabilize the engine speed at a value determined by the setting of the frequency-sensing means.

While highly advantageous for many purposes, the latter system, and other previously-known governor systems as well, tend to adjust the fuel control to a desired predetermined position productive of the intended engine speed and to maintain the fuel control substantially fixed in this position so long as no change in operating conditions occurs. Once the fuel control has been set in this fixed position, static friction arises in the control and associated linkages and elements, which results in a substantial frictional resistance to later changes in position of the fuel control when they are required to accommodate and counteract changes in conditions, such as changes in load on the engine, for example. This resistance to movement due to static friction tends to detract from the speed and precision of automatic control provided by the governor system as a whole.

Accordingly, it is an object of the invention to provide new and useful electric governor apparatus.

Another object is to provide such apparatus in which the effects of static friction in the control mechanisms are substantially reduced or eliminated.

SUMMARY OF THE INVENTION

In accordance with the invention, these and other objects are achieved by the provision of electric governor apparatus comprising electro-mechanical means, such as a solenoid actuator, having a member which is movable in response to control signals supplied to the electro-mechanical means to vary the speed of an engine; the speed of the engine is sensed by means which produce an electrical signal representative of engine speed. This speed-representing electrical signal is supplied to control circuit means which respond thereto to generate a control signal and to supply it to the electro-mechanical means for varying the engine speed in the sense to oppose departures of the engine speed from a predetermined value, so that the desired governing action is achieved. In addition, the control circuit means comprises means for producing substantially continuous oscillating motion of the movable member of the electro-mechanical means, at a sufficiently high rate that corresponding changes in engine speed due to the oscillating motion are negligible. The continuous oscillating motion thus produced eliminates static friction from the fuel control apparatus operated by the movable member, but provides an average position of the latter member suitable for maintaining the desired predetermined engine speed in response to the governor action. Preferably the control signal has alternately smaller and larger values during immediately successive time intervals, and the desired regulation is achieved by varying the relative durations of the immediately successive intervals in response to the electrical signal representative of engine speed.

In a preferred embodiment, speed-sensing means such as a pickup coil are used to derive an original electrical signal having a frequency varying with the speed of the engine to be governed. This original signal is passed through a saturating AC amplifier, the output of the AC amplifier then varying with the frequency of the amplifier output signal but being substantially invariant with changes in R.M.S. value of the original signal. The latter amplifier output signal is passed through an AC filter and speed control circuit which provides a frequency-sensing function in that its output varies with frequency of input signal once the frequency has risen into a range corresponding to the range of engine speeds within which governing action is to be provided. For constant-speed operation, the frequency-response of the AC filter and speed control circuit is normally preset and not varied over any substantial range, while for variable speed operation it is continuously variable over a wide range. The output of the AC filter and speed control circuit is rectified and filtered and supplied to a Schmitt trigger circuit provided with a feedback connection such that the Schmitt circuit alternates between its normal and abnormal conduction conditions as soon as the signal from the rectifier and filter circuit reaches a predetermined threshold level. The solenoid actuator is supplied with current through a transistor which is normally fully-on when the Schmitt trigger circuit is in its normal state, but which is turned off when the Schmitt circuit is actuated to its abnormal conduction state.

Accordingly, once the engine has come up to the speed for which the rectifier and filter circuit causes the Schmitt circuit to be triggered to its abnormal condition, current to the solenoid actuator is alternately switched on and off so that the movable mechanical member thereof is continuously in oscillating motion. The desired governing action is achieved by virtue of the fact that the signal supplied to the Schmitt trigger circuit from the rectifier and filter controls the relative durations of the normal and abnormal states of the Schmitt trigger circuit and hence the time durations of the pulses through the solenoid actuator. Thus, for example, if the engine tends to run at too high a speed, the relative durations of the time intervals of conduction through the solenoid actuator are reduced, whereby the average current through the actuator is reduced to oppose the above-mentioned tendency for the engine speed to increase.

It will be understood that the engine system will exhibit a substantial amount of inertia in that it cannot change its speed appreciably in response to changes in the position of the movable member of the solenoid actuator which take place at greater than a predetermined rate. This inertia is due in part to the mechanical mass inertia of the engine, and in part to the tendency for the amount of fuel actually subject to combustion at any given time to be relatively insensitive to rapid fluctuations in the fuel control. Accordingly, the desired "dither" of the movable member of the solenoid actuator can be provided to prevent static friction without introducing corresponding fluctuations in the speed of the motor.

BRIEF DESCRIPTION OF THE FIGURES

These and other objects and features of the invention will be more readily understood from a consideration of the following detailed description taken in connection with the accompanying drawings, in which the figure is a schematic diagram illustrating one preferred form of system embodying the present invention.

SPECIFIC EMBODIMENTS

Referring now to the embodiment of the invention shown in the figure by way of example only, there is illustrated an engine 10, such as a diesel or gasoline engine, for example, having a fuel control 12 operable to various positions to control the fuel supply to engine 10 in response to electrical signal supplied to control winding 14 of electrical actuator 16, each value of electrical current through the control winding 14 producing a corresponding predetermined adjustment of fuel control 12. The actuator is preferably spring biased in the direction of decrease fuel supply, increasing current through winding 14 serving to increase the fuel supply. It will be understood that the movable member 17 of the solenoid-type electrical actuator 16 is normally mechanically linked with the fuel control 12 by apparatus capable of exhibiting a substantial amount of static friction, and that the existence of such static friction is overcome in the present invention by maintaining the movable member 17 in continuous oscillating motion, this motion however being at such a high rate that the engine speed does not follow this motion and instead remains at a value corresponding to the average position of movable member 17.

One mechanical output of engine 10 is coupled to shaft 20 of toothed gear 22, which is shown meshing with and driving another toothed gear 24 a shaft 26 of which is connected to drive a load 28.

At least one of the gears, e.g. gear 22, is of a magnetic material and has disposed adjacent the path of the tip of its teeth a speed-sensing means or pickup 30, comprising in this example a permanent magnet 32 having a coil 34 of copper wire wound around it, this pickup being disposed sufficiently close to the path of the tips of the gear teeth that there is induced in coil 34 an electrical signal of a frequency equal to the frequency of passage by it of the gear teeth. In the present form of the device the voltage induced in coil 34 is substantially sinusoidal in form.

The portion of the apparatus of the figure thus far described is identical with that described in detail in our above-identified co-pending application, with the exception of the provision of the oscillating motion or "dither" mentioned above, and the remainder of the apparatus of the figure now to be described differs from that of our above-identified co-pending application only in certain minor details, with the important exception or the provision of the novel apparatus which produces the "dither" operation referred to above. Accordingly, the details of construction and operation of the system, other than those portions producing the "dither" operation, need not be described in detail herein.

The electrical output of coil 34 is applied to a saturating AC amplifier shown enclosed within the dotted block 36. This amplifier serves as a limiter for removing amplitude variations from the original signal applied to its input from pickup 30. To this end, one lead from coil 34 is connected to a source of reference potential designated as ground, by way of lead 42, and the other lead from coil 34 is connected to AC amplifier 36 by way of lead 40. Lead 40 is connected by way of rectifier 43 to the base 50 of an NPN transistor 52, the rectifier 43 being poled so that its cathode element is directly connected to base 50. Another diode 35 is connected between transistor base 50 and ground, also with its cathode element directly connected to base 50. Diodes 43 and 53 cooperate to supply transistor base 50 only with positive half cycles of the voltage from coil 34, the negative half-cycles being blocked by diode 43 and shorted to ground by diode 53. These diodes therefore serve to protect transistor 52 from excessively high reverse base voltages which may be generated by pickup 30 under some conditions of operation.

Emitter 54 of transistor 52 is connected directly to ground, while collector 56 thereof is connected through a load resistor 58 to a source of positive potential designated B+. The latter positive potential is derived from an unregulated voltage source 59, such as a battery, by way of a power switch 60A, a rectifier 60B, and a series resistor 61A the lower end of which is connected to ground by a voltage-regulating Zener diode 61B. Switch 60A constitutes the power switch for the governor, and rectifier 60B, the anode of which is connected to the positive terminal of battery 59, prevents damage to the equipment should the battery be connected in the wrong polarity.

The signal at collector 56 of transistor 52 is AC-coupled by way of capacitor 62 to the base 64 of another NPN transistor 66. Preferably both transistors 52 and 66 are of the silicon type. The emitter 68 of transistor 66 is connected directly ot ground, while its collector 70 is connected by way of load resistor 72 to positive supply voltage B+. Bias for the base 64 of transistor 66 is provided by means of a voltage divider arrangement comprising resistor 74, connected between collector and base of transistor 66, and resistor 76, connected between base 64 and ground.

In one representative embodiment transistors 52 and 66 may be silicon type 2N2926 transistors, resistors 58, 72, 74 and 76 may have respective values of 470 ohms, 270 ohms, 5,100 ohms, and 1,000 ohms and capacitor 62 may have a value of 8.2 microfarads.

The effect of the first transistor 52 is to amplify the original input signal to a magnitude sufficient to drive the second transistor 66 strongly between cutoff and collector saturation, so that one half-cycle of the input sinusoidal wave is effectively clipped off entirely, while the other half-cycle is converted to a series of substantially rectangular pulses of constant amplitude, the R.M.S. value of the pulse series remaining the same over a wide range of engine speeds, as explained fully in our above-mentioned co-pending application. Accordingly the output of saturating AC amplifier 36 comprises a series of rectatngular pulses of constant amplitude recurrent at the frequency of the original sinusoidal input signal and of substantially constant R.M.S. value over the operating range of the regulator. To ensure that the maximum voltage at the collector 70 of transistor 66 is constant, a Zener diode 79 is preferably connected between collector 70 and ground in the polarity such that the Zener diode breaks down when the collector voltage exceeds the predetermined desired maximum value.

The output of amplifier 36 is applied to the input of AC filter and speed control circuit 80 by way of a large AC coupling capacitor 82. Aside from the addition of diodes 43 and 53 and of Zener diode 79, amplifier 36 is identical with that described in our above-identified co-pending application, and the operation thereof is directly analogous to that described therein.

AC filter and speed control circuit 80 comprises a frequency-sensing circuit which produces output pulses having amplitudes dependent upon their frequency of recurrence. In the embodiment illustrated, the AC filter is preferably of the so-called Zobel class, comprising constant-K or m-derived filter arrangements, and is of the high-pass type with a frequency characteristic having a steep lower-frequency skirt extending through a band including frequencies equal to the repetition rate of pulses applied thereto from amplifier 36 when the engine is operating in its governed range. While in some embodiments of the invention the frequency-response of the filter may be adjustable over a wide range to provide so-called variable speed operation, in the present example it is assumed that it is normally preset to a desired condition to provide so-called constant-speed governing action.

More particularly, in the present embodiment AC filter and speed control circuit 80 comprises a pair of equal-valued capacitors 84 and 86 connected together at a junction point 88, the other terminal of capacitor 84 being connected to coupling capacitor 82 and the other terminal of capacitor 86 being connected to output lead 90 of the AC filter and speed control circuit. Said other terminal of capacitor 84 is also connected to ground by way of resistor 92, while said other terminal of capacitor 86 is connected to ground by way of a series combination of fixed resistor 94 and variable resistor 95. The junction point 88 is connected to ground through an inductor 98, which is adjustable over a limited range to provide governing operation at the speed desired for the particular application. Variable resistor 95 provides a fine vernier adjustment of the frequency response of the filter, and is ordinarily made available at the exterior of the equipment to permit operator adjustment.

In one representative embodiment, capacitors 82, 84 and 86 may have respective values of 15 microfarads, .018 microfarad and .018 microfarad; resistors 92 and 94 may have values of 2,200 ohms; and resistor 95 may be variable from 0 to 2,500 ohms.

It will be understood that an AC filter and speed control circuit identical with that described in our above-identified co-pending application may be used for variable-speed governor action, and that control of the frequency-response may be provided by using a fixed inductor and a variable capacitor, instead of a variable inductor. The typical type of response characteristic produced by such filters and their operation in response to the input signal from the preceding amplifier are set forth in detail in the above-identified co-pending application.

The pulses from AC filter and speed control 80, having amplitudes modified in accordance with the relation of their recurrence frequency to the position of the lower-frequency skirt of the frequency characteristic of the AC filter, are then supplied to rectifier and DC filter circuit 106. The latter circuit functions to produce between its output leads 108 and 110 a direct voltage which varies in accordance with the amplitude of the train of pulses supplied thereto from AC filter and speed control circuit 80. This direct voltage therefore has a magnitude substantially proportional to the pulse recurrence frequency when the latter frequency lies within the frequency band occupied by the lower skirt of the frequency characteristic of AC filter and speed control circuit 80.

Rectifier and DC filter circuit 106 may take any of a large variety of known forms, including the form shown in our above-identified co-pending application. In the particular simplified embodiment illustrated in the figure, it comprises a diode 114 having its anode grounded and its cathode connected to a junction point 115 to which is also connected the anode of another diode rectifier 116. The cathode of the latter diode is connected to a filtering and smoothing circuit consisting of a series resistor 118, a shunt capacitor 120 and a shunt capacitor 122, the latter two elements being connected between ground and opposite ends of resistor 118. The terminal of resistor 118 opposite that connected to diode 116 is connected to output lead 108. This circuit arrangement is effective to provide the above-described operation for producing between output leads 108 and 110 a direct voltage varying substantially only with engine speed.

In one representative embodiment, resistor 118 may have a value of 100 ohms, resistor 122 a value of 5,100 ohms and capacitor 120 a value of 39 microfarads.

The output of rectifier and DC filter circuit 106 is supplied to the input of DC amplifier and dither circuit 130, which generates the signals for producing the continuously oscillating "dither" motion of movable member 17 of actuator 16, and which also responds to the slowly-varying DC voltage at input lead 108 to produce an average position of movable member 17 such as to provide the required governing action. It is this portion of the system that differs importantly from the otherwise generally similar system described in our above-identified co-pending application.

In this connection it is noted that actuator 16 is preferably of the type described and claimed in the co-pending application Ser. No. 570,802 of Merton I. Rosenberg and John A. Kimberley, entitled Rotary Electromagnetic Actuator, and filed Aug. 8, 1966, which utilizes a rotary armature spring-biased against the magnetizing force produced by the magnetizing winding 14, the spring bias being in the direction to slow down engine 10. Increasing current through winding 14 therefore opens the throttle and increases engine speed. To supply control current to actuator winding 14, one end 130 of winding 14 is connected to the cathode of rectifier 60B, and by way of switch 60A, to the positive terminal of voltage source 59. The other end 132 of actuator winding 14 is connected to ground by way of the collector-to-emitter path of NPN transistor 134. More particularly, the emitter of transistor 134 is directly grounded and its collector is connected directly to the end 132 of winding 14. A kick-back suppressor rectifier 136 is preferably connected across winding 14.

The function of the circuitry now to be described is to turn transistor 134 substantially completely on and off alternately, at a substantially periodic rate higher than that to which the speed of the engine 10 can respond, and to vary the relative durations of the on and off intervals of transistor 134 in response to changes in the voltage at lead 108, so that the average current through actuator winding 14 can be varied to provide the desired governing action.

To this end, DC amplifier and dither circuit 130 employs a modified Schmitt trigger circuit comprising transistors 140 and 141. Transistor 141 is of the NPN type having its emitter grounded by way of resistors 144 and 146 in series and having its collector connected to B+ by way of the series combination of resistors 148 and 150. Transistor 140 is also of the NPN type, and has its emitter grounded by way of resistor 146. Its collector is connected to B+ by way of the series combination of resistors 154 and 156. The voltage divider comprising resistors 158 and 160 in series is connected between the collector of transistor 140 and ground, and the base of transistor 141 is directly connected to the tap point 162 between the latter two resistors. The portion of the circuit thus far described comprises a conventional Schmitt trigger circuit in which transistor 140 is the normally off transistor and transistor 141 is the normally on transistor.

The tap point 170 between resistors 148 and 150 is connected directly to the base of a transistor 172 of the PNP type, the emitter of which is directly connected to B+ and the collector of which is connected to ground through the series combination of resistors 174, 176 and 178. When transistor 140 is in its normal off condition, transistor 141 is in its normal on condition, and transistors 172 and 134 are also in their on conduction states. In the absence of signals supplied over lead 108, transistor 140 is held in its normally-off state by means of a base bias voltage supplied thereto by way of resistor 180 from the variable tap 182 on a resistor 184 connected between ground and the positive supply line 186. The latter positive supply line is maintained at a substantially fixed positive voltage by connection to the B+ line through resistor 156, and by the regulating action of Zener diode 188 connected between lead 186 and ground. By adjustment of tap 182, the amount of voltage required to be supplied to the base of transistor 140 from lead 108 by way of series input resistor 192 to turn on transistor 140 can be adjusted to suit the particular application. Since Zener diode 188 maintains the voltage at the interconnection of resistors 154 and 156 at a substantially constant positive value, such as 7 volts, the effective collector supply voltage for transistor 140 is this lower voltage rather than the full B+ voltage, which is typically 24 volts.

A gain-controlling feedback circuit is also preferably provided, consisting of the circuit extending from the collector of transistor 172 through variable resistor 196 to the base of transistor 140. Adjustment of variable resistor 196 changes the amount of such feedback and provides a convenient gain control; rectifier 198, having its anode connected to the collector of transistor 172 and its cathode connected to positive supply line 186, serves to limit the voltage which can be thereby applied to the base of transistor 140, to limit the gain and prevent overload of the amplifying transistors. A capacitor 200 is also connected between the base of transistor 140 and ground, which tends to maintain the base voltage constant, or to resist rapid changes in base voltage.

The portion of DC amplifier and dither circuit 130 thus far described will therefore operate to keep transistor 134 fully on, and to provide maximum current to winding 14 of actuator 16, when switch 60A is first closed and the engine 10 is coming up to speed. When engine 10 reaches the speed corresponding to the frequencies to which AC filter and speed control circuit 80 is sensitive, a positive DC voltage will begin to build up at lead 108 until the point is reached at which transistor 140 is turned on, and transistors 141, 172 and 134 are turned off, so that the current through winding 14 of actuator 16 will be terminated. This will reduce the fuel supply drastically and engine 10, after some initial overshoot of the desired speed, will slow down again until the voltage at lead 108 decrease to the point where the Schmitt trigger circuit can return to its normal condition and transistor 134 is again turned on. This action in itself is capable of maintaining the speed of engine 10 within approximately the desired range.

However, in accordance with the invention, there is also provided an AC negative-feedback connection from the tap point 204 between resistors 174 and 176 to lead 108 at the input of the DC amplifier and dither circuit 130. This feedback connection includes an adjustable time-constant circuit comprising capacitor 208 and variable resistor 210 in series with each other. The effect of this feedback connection is to feed back to lead 108 a pulse each time the Schmitt trigger circuit changes state. More particularly, when the voltage at lead 108 from filter circuit 106 becomes sufficient to turn on transistor 140 and to turn off transistor 172, a negative pulse is fed back through capacitor 208 and resistor 210 to lead 108 in the polarity and with an amplitude normally sufficient to return the Schmitt circuit to its normal conduction state, in which transistor 134 is on. The Schmitt circuit then remains in this condition until the base voltage of transistor 140 recovers the value necessary to turn transistor 140 on again. During the period of severe overshoot of engine speed which normally immediately follows the initial build-up of engine speed when the engine is first turned on, the feedback pulse may not be effective to produce the latter type of operation because of the large voltage delivered to lead 108 by circuit 106; however, as soon as the initial startup period is ended and the engine speed is in the desired approximate range, the feedback pulses will be sufficient to produce a repetitive turning on and off of transistor 140, and hence of transistor 134, at a rate determined by the circuit values, which rate may typically be of the order of 1,000 cycles per second. Under these conditions of operation, the time required for transistor 140 to come on again is determined by the combination of the bias voltage, the voltage from circuit 106 and the negative feedback pulse voltage, all of which, with the exception of the voltage from circuit 106, are fixed once the circuit has been adjusted. The greater the voltage supplied from circuit 106, the longer the intervals during which transistor 134 is turned off, so as to reduce the average current through actuator coil 14 and reduce the engine speed toward the desired governed speed.

It will therefore be appreciated that the turning on and off of transistor 134 causes movable arm 17 of actuator 16 to be perpetually in oscillating motion, with its average position however controlled by the servo action of the complete loop so as to hold the engine speed at the desired governed point despite change in load on the engine.

The frequency of motion of movable member 17 is sufficiently high that the speed of the engine 10 does not follow it, but instead remains substantially constant. The amplitude of vibration of member 17 is preferably small, typically so small as not to be readily visible to the naked eye although it can be sensed by touch. In using the system with any given motor, the resistor 210 is adjusted to provide optimum stability, and is ordinarily set to larger values for larger engines.

Accordingly there has been provided an engine governor system in which the mechanical elements for controlling fuel supply are kept constantly in motion to prevent the occurrence of static friction, but in which the average position of the fuel control is maintained at the proper value to produce the desired governing action and to maintain the engine speed substantially constant for any given setting of the AC filter circuit.

In one preferred embodiment the values of the elements of DC amplifier and dither circuit 130 may be as follows:

Transistors:
    140 and 141—Type 2N2926
    172—Type 2N1131
    134—Type 2N3055
Zener diode 188—Type 1N4736A
Resistors:
    144—39 ohms
    146—680 ohms
    148—2,200 ohms
    150—2,200 ohms
    154—680 ohms
    156—200 ohms
    158—3,900 ohms
    160—2,400 ohms
    174—100 ohms
    176—100 ohms
    178—200 ohms
    180—39,000 ohms
    192—6,800 ohms
Variable resistor 196—0–1 megohm
Potentiometer 182—1,000 ohms
Variable resistor 210—0–25,000 ohms
Capacitors:
    200—.033 microfarad
    208—10 microfarads While the invention has been descirbed with particular reference to specific embodiments thereof in the interest of definiteness, it will be understood that it may be embodied in any of a variety of forms diverse from those described, without departing from the scope of the invention as defined by the following claims.

What is claimed is:

1. In a governed engine system, the combination with an engine of electric governor apparatus comprising:
   electro-mechanical means having a member movable in response to control signals supplied to said electro-mechanical means for varying the speed of said engine, said engine having different speeds for different fixed positions of said member;
   means responsive to operation of said engine for producing an electrical signal having a magnitude representative of the speed of said engine; and
   control circuit means responsive to said electrical signal to supply said electro-mechanical means with a control signal for varying said engine speed in the sense to oppose departures thereof from a predetermined value;
   said control circuit means comprising means for producing substantially continuous oscillating motion of said movable member at a sufficiently high rate that corresponding changes in engine speed are negligible.

2. The combination of claim 1, in which said control signal has alternately smaller and larger values, and in which the relative durations of the intervals during which said control signal has said smaller and larger values are variable in response to said electrical signal.

3. In a governed engine system, the combination with an engine of electric governor apparatus comprising:
   speed-sensing means for deriving an original electrical signal having a frequency varying with the speed of said engine to be governed;
   frequency-sensing means supplied with said electrical signal for producing an output signal having a strength varying with said frequency of said original signal;
   electro-mechanical means comprising a member movable in response to a control signal to vary the speed of said engine;
   means for generating a control signal having a higher value during a first set of time-spaced intervals and a lower value during a second set of time-spaced intervals alternating with said intervals of said first set, said generating means being responsive to said output signal to change the relative durations of said first and second intervals; and
   means for supplying said control signal to said electro-mechanical means to maintain said member in substantially continuous oscillating motion and to automatically adjust the average position of said member so as to hold said engine speed at a desired value.

4. In a governed engine system, the combination with an engine of electric governor apparatus for automatically controlling the speed of said engine comprising:
   a solenoid-operated electro-mechanical actuator comprising an armature member and a control coil responsive to changes in current through it to change the position of said armature;
   mechanical means connected to said armature and responsive to motion of said armature to change the supply of fuel to said engine;
   means for producing an electrical signal varying in strength in accordance with changes in speed of said engine; and
   a control circuit responsive to said electrical signal for developing a control current and for passing said control current through said control coil, said control current having an average value varying in a sense to oppose departures of said engine speed from a predetermined value;
   said control circuit comprising a source of direct voltage and an electronic switching device in series with said control coil, means for turning said switching means alternately on and off, and means responsive to said electrical signal for varying the relative durations of the intervals during which said switching means is on and off, so that the average current in said control coil has a value such as to maintain said engine speed substantially at a predetermined desired value, said turning on and off of said switching means producing a continuous oscillating motion of said armature member whereby static friction in said mechanical means is eliminated.

5. Control circuit means for operating an electro-mechanical device having a control element and a member movable in response to changes in current supplied to said control element, said circuit means comprising:
   a source of fixed potential;
   a first transistor;
   means connecting the collector-to-emitter path of said first transistor in series with said source and said control element, said transistor being responsive to voltage of at least a first value to turn said transistor on and to voltages of less than a second value to turn said transistor off;
   a Schmitt trigger circuit comprising a second normally-off transistor and a third normally-on transistor, said third transistor being connected to be turned off when said second transistor is turned on and to revert to its on state when said second transistor is turned off;

a fourth transistor connected to said third transistor and to said first transistor for turning said first transistor on and off when said third transistor is in its on and off states, respectively;

means for normally biasing said second transistor off;

means for supplying said second transistor with a varying control signal effective to turn on said second transistor when said control signal has a value in excess of a predetermined minimum value; and feedback circuit means for supplying said second transistor with a pulse tending to turn it off momentarily each time said third transistor is turned off, thereby to cause said first and said third transistors to be turned on and off with a periodicity dependent upon the values of components in said feedback circuit, the relative durations of the intervals during which said first transistor is on and off being dependent upon the value of said control signal.

6. The control circuit means of claim 5, comprising a first resistor in series with the base of said second transistor, means for supplying said varying control signal to said base through said first resistor, and a load circuit for said fourth transistor, in which said feedback circuit means comprises the series combination of a second resistor and capacitive means connected between said load circuit and the terminal of said first resistor more remote from said base, said control circuit means further comprising additional capacitive means connected between said base and a source of fixed potential.

References Cited
UNITED STATES PATENTS

| | | | |
|---|---|---|---|
| 2,465,358 | 3/1949 | Curtis et al. | 317—5 |
| 2,960,629 | 11/1960 | Oldenburger | 317—5 |

J D MILLER, Primary Examiner

W. J. SMITH, Assistant Examiner

U.S. Cl. X.R.

123—102; 318—326, 341